(12) United States Patent
Cappa et al.

(10) Patent No.: US 6,340,107 B1
(45) Date of Patent: Jan. 22, 2002

(54) AUTOMATIC MOTOR VEHICLE ASSEMBLY AND WELDING STATION

(75) Inventors: Sergio Cappa; Antonio Recupero, both of Turin (IT)

(73) Assignee: Advanced Technologies S.r.l., Pianezza (IT)

(*) Notice: Subject to any disclaimer, the term of this patent is extended or adjusted under 35 U.S.C. 154(b) by 0 days.

(21) Appl. No.: 09/694,284

(22) Filed: Oct. 24, 2000

(30) Foreign Application Priority Data

Oct. 25, 1999 (IT) .......................................... MI99A2224

(51) Int. Cl.[7] ........................ B23K 37/04; B23Q 15/14; B23Q 15/22; B23P 21/00
(52) U.S. Cl. ............................. 228/4.1; 228/6.2; 228/9; 228/49.1; 228/103; 29/712
(58) Field of Search .................... 228/4.1, 6.1, 49.1, 228/44.3, 8, 102, 9, 103, 10, 104; 29/407.01, 429, 430, 464, 466, 407.04, 712; 219/79, 80, 125.1, 158, 161, 86.29

(56) References Cited

U.S. PATENT DOCUMENTS

| | | | |
|---|---|---|---|
| 5,005,277 A | * | 4/1991 | Uemura et al. |
| 5,010,634 A | * | 4/1991 | Uemura et al. |
| 5,155,690 A | * | 10/1992 | Nomaru et al. |
| 5,166,874 A | * | 11/1992 | Nomaru et al. |
| 5,168,453 A | * | 12/1992 | Nomaru et al. |
| 5,380,978 A | * | 1/1995 | Pryor |
| 6,065,199 A | * | 5/2000 | Bossotto et al. |
| 6,173,822 B1 | * | 1/2001 | Booker et al. |
| 6,193,046 B1 | * | 2/2001 | Segawa et al. |

FOREIGN PATENT DOCUMENTS

| | | |
|---|---|---|
| EP | 0147530 A2 | 7/1985 |
| EP | 0350097 A1 | 1/1990 |
| EP | 1000699 A2 | 5/2000 |
| JP | 2001151173 A * | 6/2001 |

OTHER PUBLICATIONS

Patent Abstracts of Japan, vol. 1996, No. 1, Jan. 31, 1996 and JP 07232270A (Nissan Motor Co. Ltd.), Sep. 5, 1995.

* cited by examiner

Primary Examiner—Tom Dunn
Assistant Examiner—Kiley Stoner
(74) Attorney, Agent, or Firm—Jacobson Holman, PLLC

(57) ABSTRACT

A motor vehicle body assembly and welding station comprises a pair of facing tool (12) support conformators (11) designed to work on the body and taken between them by a conveyor system (14). The conformators are movable between a rest position in which the body is free to enter and exit the station and a work position in which the tools are near the body to work on it. At least some of the tools (12) comprise measurement means (20) for the relative position of facing body parts and the conformators have an intermediate position between said work and rest positions. On command control means (19) take the conformator into said intermediate position and activate the measurement means (20) to determine the agreement of body dimensions with predetermined measurement intervals and issue acceptance or rejection signals (22) for the body on the basis of the survey result.

8 Claims, 3 Drawing Sheets

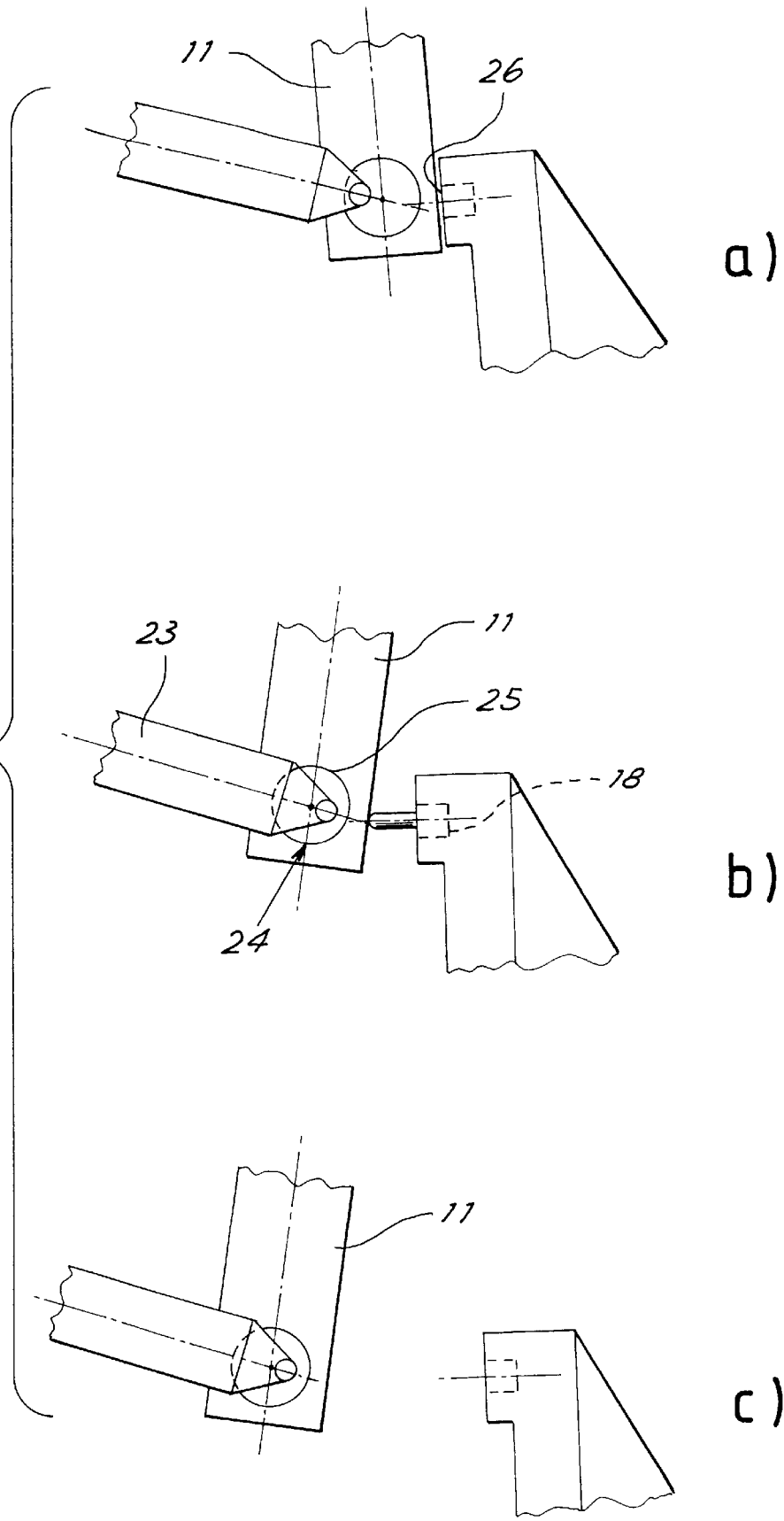

AUTOMATIC MOTOR VEHICLE ASSEMBLY AND WELDING STATION

BACKGROUND OF THE INVENTION

The present invention relates to an automatic motor vehicle body assembly and welding station with innovative characteristics which allow fast and accurate verification of the good performance of the assembly and welding operations without the need of conveying the body out of the station.

In the prior art, automatic assembly and welding stations made up of facing conformator pairs, i.e. movable supporting frames for the body holding and welding equipment, are well known. Between the conformators runs a conveyance way for the bodies to be subjected to the various processing steps. When a body arrives in the station the conformators move toward each other to approach the body from opposite sides and the equipment is taken into position to work on the body. After performance of the planned operations the conformators withdraw and the body is freed to be conveyed from the runway to the next processing station.

Over time variants of the structure of the stations of this type have been proposed mainly to make movement of the conformators more efficient and/or more satisfactory for specific requirements. For example, stations with conformators turning around an upper or lower horizontal axis, stations with conformators translating parallel to themselves in a direction transversal to the runway, or even stations with conformators replaceable automatically with others taken from appropriate automatic storerooms to allow fast adaptation of the station to processing of a different body model have been proposed. The basic principle of the stations proposed heretofore has however always been the same.

In body production it is clearly important to respect very precise dimensional characteristics. In the prior art, to control assemblies performed by the above mentioned stations it is usual (commonly by sampling) to take an assembled body, set it on a measurement bench (usually automatic) and verify whether the measurements taken this way are within the preset tolerances. If the measurement gives a negative outcome the system is stopped and investigation takes place to find the part thereof responsible for the error, which is usually caused by lack of setting, wear or failure of some holding member in a welding station.

Clearly, even though widely followed, such a procedure is quite costly because, among other reasons, of the long stoppage of the installation it causes. The cost caused by the fact that the body is not acceptable but is uselessly subjected to further processing after that which produced the fault should be taken into consideration. To this must be added the fact that if the inspection is performed by sampling the fault is observed statistically after a certain number of faulty bodies have already been produced.

The general purpose of the present invention is to remedy the above mentioned shortcomings by making available an assembly station of the type with conformators allowing real-time identification of assembly faults and dimensional parameters of the product out of tolerance.

SUMMARY OF THE INVENTION

In view of this purpose it was sought to provide in accordance with the present invention a motor vehicle body assembly and welding station comprising a pair of facing tool support conformators designed to work on the body which is taken between them by a conveyor system with the conformators being movable between a rest position in which the body is free to enter and exit the station and a work position in which the tools are near the body to work on it characterized in that at least some of the tools comprise measurement means for the relative position of facing body parts and that the conformators have an intermediate position between said work and rest positions with control means taking the conformator into said intermediate position and activating the measurement means to detect the agreement of body dimensional parameters with predetermined measurement intervals and issue acceptance or rejection signals for the body on the basis of the survey result.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 3 shows an enlarged diagrammatic view of a limited handling mechanism for a conformator of the station of FIG. 1.

DETAILED DESCRIPTION OF THE INVENTION

Figure 1:
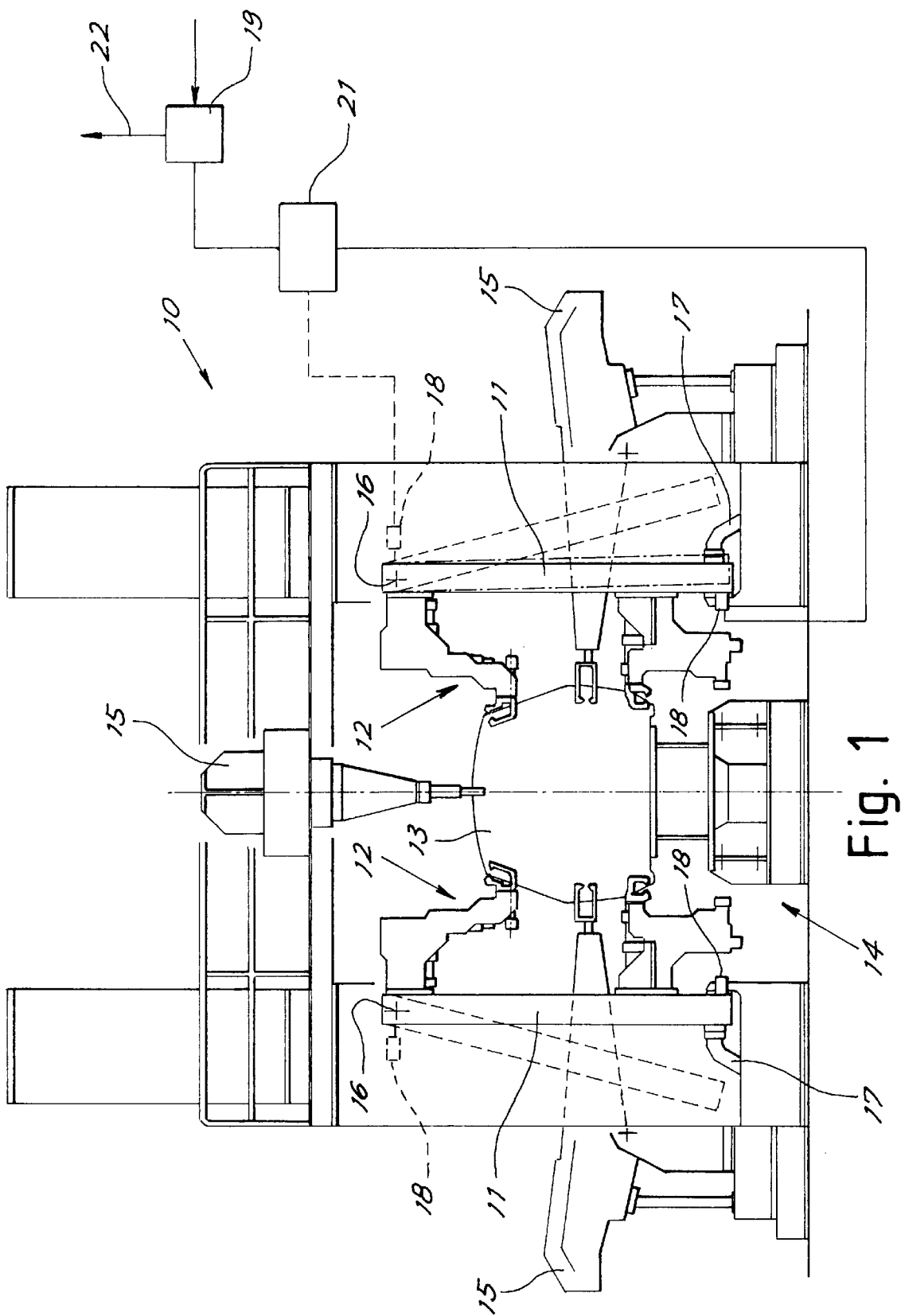
FIG. 1 shows a diagrammatic cross section view of a body assembly and welding station provided in accordance with the present invention.

With reference to the figures FIG. 1 shows a diagrammatic view of a station indicated as a whole by reference number 10 accomplished in accordance with the present invention. Station 10 comprises a pair of facing tool support conformators 11 shown diagrammatically at reference number 12 and designed to work on a body 13. The body is taken between the conformators by a conveyor system or line 14. Additional processing facilities such as e.g. robotized arms 15 can be provided.

As may be seen in FIG. 1 the conformators 11 are movable between a rest position shown in broken lines in which the body is free to enter and exit the station and a work position shown in solid lines in which the tools are near the body to work on it.

For movement between the work and rest positions in the described embodiment the conformators are pivoted around a horizontal axis 16 near one of their upper sides and around which they are commanded to tilt by means of actuators 17.

The tools can comprise virtually known holding means which grasp various parts of the body to allow their welding by other tools and robotized arms as is known in the field.

The tools are not shown nor described in greater detail except as is useful for understanding the present invention since in their general lines they are known and readily imaginable for those skilled in the art.

In accordance with the principles of the present invention the conformators have a position, drawn in dash and dot for the right-hand conformator only, which is intermediate between the above mentioned work and rest positions and can be reached on command of control means 19.

This intermediate position is far enough from the work position to free the body from interference with the holding tools 12. For example a distance from the work position such as to have 2 to 3 cm of tool movement could suffice.

Figure 2:
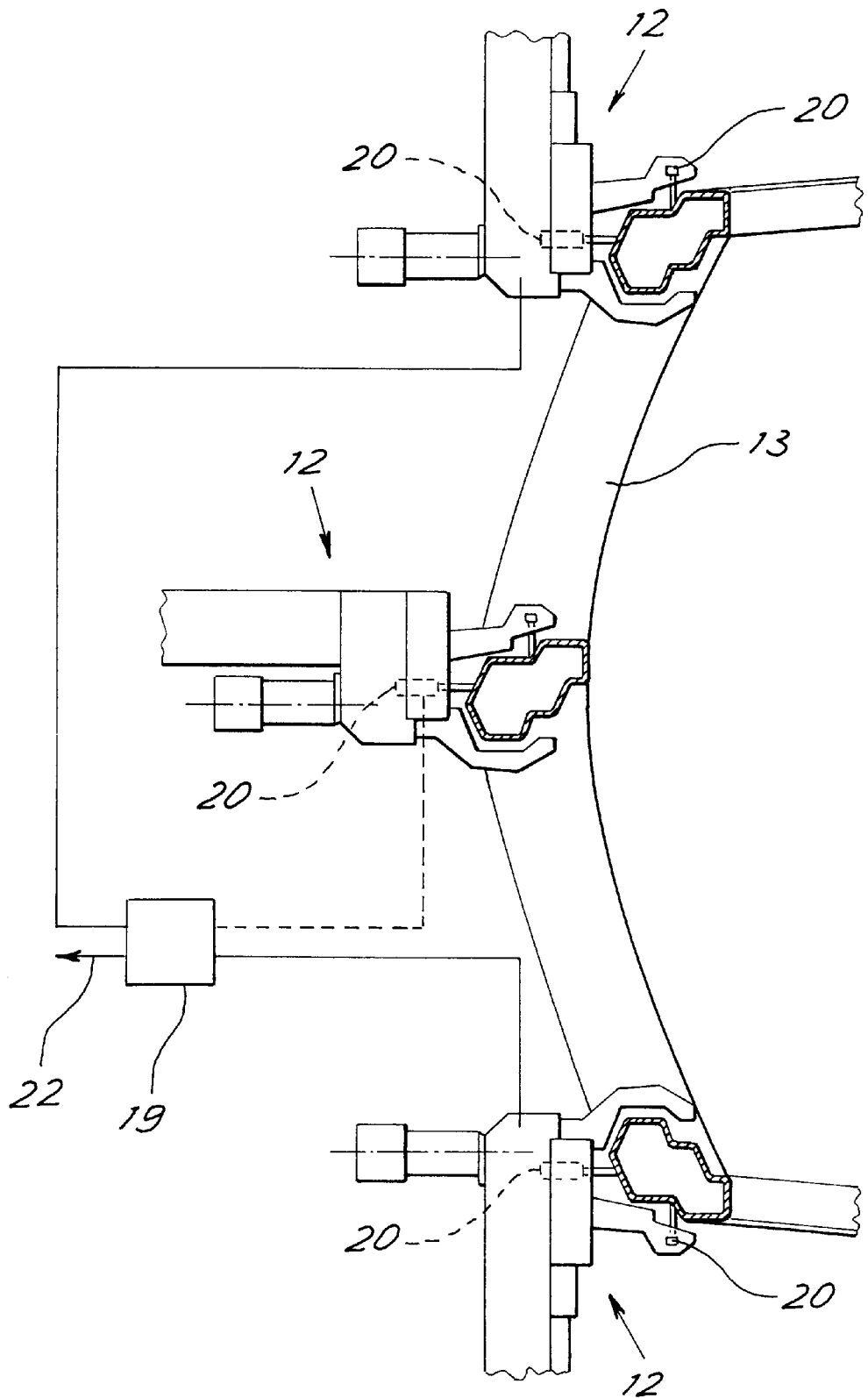
FIG. 2 shows an enlarged diagrammatic view of a tool mounted on a conformator of the station of FIG. 1.

As may be seen in FIG. 2, at least some of the tools 12 comprise measurement means 20 for the relative position of facing body parts. These means can be optical or inductive resistive as preferred. The measurement means are connected to control means 19 which on command move the conformators to an intermediate position so as to release the body from the tool and with the measurement means read the agreement of dimensional parameters of the body with amounts determined in advance to be acceptable. The control means 19 emit signals 22 of acceptance or rejection of the body on the basis of the measurement results.

Advantageously the control means are temporarily activated upon movement of the conformators towards the rest position before the body exits the station. In other words, once the body has been processed by the various station tools the conformators move from the processing position toward the intermediate position and the measurement means make the measurements and then the conformators continue the movement towards the rest position. If the body is accepted it continues along the conveyor line toward the next processing line but otherwise provisions are made to eliminate the body from the line and if necessary send it to a repair station and the station can be rapidly checked and returned to operation after elimination of the cause that produced the unacceptable fault.

To have a sure reference for the measurements of the sensors 20 the station can advantageously comprise sensors for reading of space coordinates of the intermediate position reached by the conformators with respect to a predetermined reference considered invariable. These sensors which are diagramed at reference number 18 in FIG. 1 can detect e.g. the angular rotation of the conformator around the horizontal axis 16. The sensors can be placed near the axis (as shown in broken lines) or at the opposite end of the conformator. In the former case they can detect the angular rotation around the axis directly while in the latter case they can detect the linear movement of the end of the conformator and calculate the rotation therefrom.

The signal produced by the sensors 18 is sent to compensation means 21 which correct the reading of the measurement means 20 on the basis of the reading of these position sensors 18 so that they correct measurement errors due to inaccuracies in positioning of the conformators in the intermediate position.

As may seen in FIG. 2, if the tools containing the measurement means are body processing tools it is advantageous to design the measurement means 20 to move between a withdrawn non-working position when the conformators are in working position and a withdrawn measurement position when the conformator is in the intermediate position. In this manner the measurement means do not interfere with processing. Retractable sensors are readily imaginable to those skilled in the art.

With reference to FIG. 3 there is shown an advantageous embodiment of the handling means of the conformators to provide movement between the three positions described above.

In accordance with this embodiment the conformators have main movement means 23 for the conformator between the work and rest positions. These main means can be made with e.g. suitable hydraulic, electrical or similar actuators. They allow sufficient movement to move the conformator between the work and rest positions.

As may be seen in FIG. 3 the main means 23 are connected to the conformator with the interposition of controlled means 24 for limited movement of the conformator relative to the main movement means by the amount corresponding to the movement of the conformator between a work and intermediate positions. In the embodiment shown the limited movement means 24 comprise a powered connection between connecting rod and crank made up e.g. of a powered wheel.

The wheel is mounted on the conformator and the actuator 23 is connected thereto in an eccentric position. As may be seen in FIG. 3a, when the conformator is in work position, e.g. defined by a front stop 26, the wheel is rotated to have the conformator advanced with respect to the pivoting with the actuator 23. To shift the conformator into the intermediate position the wheel turns to back the conformator and advance the pivoting point of the actuator 23 (FIG. 3b). The exact position of the conformator is measured by the sensor 18, e.g. with respect to the stop 26. When the measurement has been taken the main actuator 23 is operated and the conformator is backed to the rest position.

In this manner the conformator moves into the intermediate position without the need to activate the main movement means, which can thus be virtually like those of conventional processing stations.

It is now clear that the predetermined purposes have been achieved by making available a processing station which also performs measurements of the accuracy of the assembly operations carried out. It is noted that the cycle time remains virtually the same as that of a known station with the measurement being performed in thousandths of a second without obstructing conformator movement.

Naturally the above description of an embodiment applying the innovative principles of the present invention is given by way of non-limiting example of said principles within the scope of the exclusive right claimed here. For example the pivoting axis of the conformators can be lower or the conformators can translate horizontally as is readily imaginable to those skilled in the art. The conformator position measurement means if any will of course be suited to the specific movement. The control means 19, 21 will be provided by appropriate electronic circuits, e.g. an appropriately programmed processor, and can even be integrated in the station control unit.

What is claimed is:

1. Motor vehicle body assembly and welding station comprising a pair of facing tool support conformators designed to work on a body and take the body between the conformators by a conveyor system with the conformators being movable between a rest position in which the body is free to enter and exit the station and a work position in which the tools are near the body characterized in that at least some of the tools comprise measurement means for a relative position of facing body parts and that the conformators have an intermediate position between said work and rest positions with control means taking the conformator into said intermediate position and activating the measurement means to determine an agreement of body dimensions with predetermined measurement intervals and issue acceptance or rejection signals for the body.

2. Station in accordance with claim 1 wherein the control means are temporarily activated upon movement of the conformators toward the rest position before the body exits the station.

3. Station in accordance with claim 1 wherein for movement of the conformators between the work and rest positions the conformators are pivoted around a horizontal axis near one of their upper or lower sides and around which they are commanded to tilt.

4. Station in accordance with claim 1 wherein said at least some tools are body work tools having measurement means made movable between a non-work position when the conformators are in work position and a measurement position when the conformator is in said intermediate position.

5. Station in accordance with claim 1 wherein it comprises sensors for reading of space coordinates of the intermediate position reached by the conformators with respect to a predetermined reference and means of compensation of the readings taken by the measurement means on the basis of the reading of said position sensors in such a manner as to correct measurement errors due to conformator positioning inaccuracies in said intermediate position.

6. Station in accordance with claim 5 wherein for movement of the conformators between the work and rest positions the conformators are pivoted around a horizontal axis near one of their upper or lower sides and around which they are commanded to tilt, and said sensor detects an angular rotation of the conformator around said horizontal axis.

7. Station in accordance with claim 1 wherein to provide said intermediate position the conformators, for movement between a work and rest positions, have main movement means connected to the conformator with an interposition of control means for limited movement of the conformator relative to said main movement means by the amount corresponding to the movement of the conformator between the work and intermediate positions in such a manner that by activating the limited movement means when the conformator is held in the work position it moves into the intermediate position with no need to activate the main movement means.

8. Station in accordance with claim 7 wherein for each conformator the limited movement means comprise a connection between connecting rod and crank between an actuator providing the main movement means and the conformator with the connection between connecting rod and crank being powered to rotate on command and provide said relative movement of the conformator with respect to the main movement means.

* * * * *